United States Patent [19]
Hargedon et al.

[11] Patent Number: 6,037,674
[45] Date of Patent: Mar. 14, 2000

[54] CIRCUIT AND METHOD OF CURRENT LIMITING A HALF-BRIDGE DRIVER

[75] Inventors: John M. Hargedon; Randall T. Wollschlager, both of Chandler, Ariz.

[73] Assignee: Motorola, Inc., Schaumburg, Ill.

[21] Appl. No.: 09/105,586

[22] Filed: Jun. 26, 1998

[51] Int. Cl.[7] .................................................. B60R 21/32
[52] U.S. Cl. .................... 307/10.1; 180/271; 280/728.1; 280/735; 340/436; 701/45
[58] Field of Search ................................... 307/10.1, 9.1, 307/31, 52; 180/268, 271; 280/728.1, 734, 735; 324/502; 340/436; 701/45, 36

[56] References Cited

U.S. PATENT DOCUMENTS

| | | | |
|---|---|---|---|
| 5,666,065 | 9/1997 | Ravas et al. | 324/769 |
| 5,670,829 | 9/1997 | Susak | 307/10.1 |
| 5,701,038 | 12/1997 | Kincaid | 280/728.1 |
| 5,734,317 | 3/1998 | Bennett et al. | 280/734 |

*Primary Examiner*—Albert W. Paladini
*Attorney, Agent, or Firm*—Rennie W. Dover

[57] ABSTRACT

A half-bridge driver provides a current limit on the low-side driver (20) and a current limit on the high-side driver (16). The current limits are initially set equal. If the low-side driver current limits, then a modulation current from the low-side driver increases the high-side driver current limit threshold to maintain stable operation of the control circuits. In addition, the present invention provides dual conduction paths to charge the main conduction transistor of the low-side driver, while detecting current limit. When current limit is detected, the charging current to the main conduction transistor is switched to current limit mode.

19 Claims, 3 Drawing Sheets

CIRCUIT AND METHOD OF CURRENT LIMITING A HALF-BRIDGE DRIVER

BACKGROUND OF THE INVENTION

The present invention relates in general to driver circuits and, more particularly, to current limiting a half-bridge driver for an airbag actuator.

Automobile manufactures regularly include airbags as standard equipment in their vehicles to comply with federal regulations. Sensors placed at strategic locations in the vehicle detect a sudden deceleration or acceleration incident to a collision and provide an electrical signal to the airbag actuator. Upon receiving the sensor signal indicating the sudden deceleration, the airbag actuator sends a firing signal to a squib, which is a detonation wire or device used to ignite an explosive charge. There is one squib physically attached to each airbag. The explosive charge releases a gas that inflates the airbag to protect the occupants of the vehicle during the impact.

The airbag and squib are physically located to protect the occupants, for example in the steering column, the passenger dashboard, door panels, etc. The sensors are typically located near the points of highest probability of impact generally around the perimeter of the vehicle, e.g. side doors, and front and rear bumpers. The actuator module may be centrally located, for example toward the rear of the engine compartment or behind the instrument panel. Electrical wiring harnesses interconnect the sensors, airbag actuator, and squibs.

The airbag actuator includes a high-side driver coupled between a high voltage power supply and one terminal of the squib, and a low-side driver coupled between a second terminal of the squib and a power supply conductor operating at ground potential. Upon receiving the sensor signal, the high-side driver and low-side driver conduct a 2 amp firing current through the squib, which is sufficient to fire the explosive charge. The airbag actuator has multiple sets of high-side drivers and low-side drivers, one set for each squib and airbag combination. For example, a first pair of high-side/low-side drivers operate the squib and airbag for the steering wheel, a second pair of high-side/low-side drivers operate the driver door panel, and so on.

The power supply must provide 2 amps of current for each of the multiple squibs, possibly simultaneously. For a vehicle with six airbags, the power supply must be capable of sourcing 12 amps of current. The power supply is typically implemented as a large bank of capacitors that are continuously charged to provide the necessary current even in the event of a primary power failure in the vehicle, which is possible during a collision.

The high-side driver and low-side driver are further current limited so that in the event of an electrical short in the wiring harness no single driver pair can draw excessive current from the power supply. Even in the event of a fault in one driver pair, the power supply must have current source capacity for the remaining operative driver pairs. The low-side driver is typically current limited to 2 amps. It is difficult to current limit the high-side driver to the same value as the low-side driver because of the potential for unstable operation and oscillations in the driver control circuits. Consequently, the high-side driver is current limited to about 2.5 amps. Unfortunately, the higher current limit on the high-side driver increases the current source requirement of the capacitor bank and increases the peak current carrying capacity of the high-side driver conduction path to 2.5 amps. The power supply and high-side driver must be made physically larger to handle the larger currents. The higher current carrying capacity of the high-side driver also decreases the robustness of the airbag actuator.

Hence, a need exists to current limit the high-side driver and low-side driver without increasing the capacity of the capacitor bank or driver conduction paths.

DETAILED DESCRIPTION OF THE PREFERRED EMBODIMENT

Figure 1:
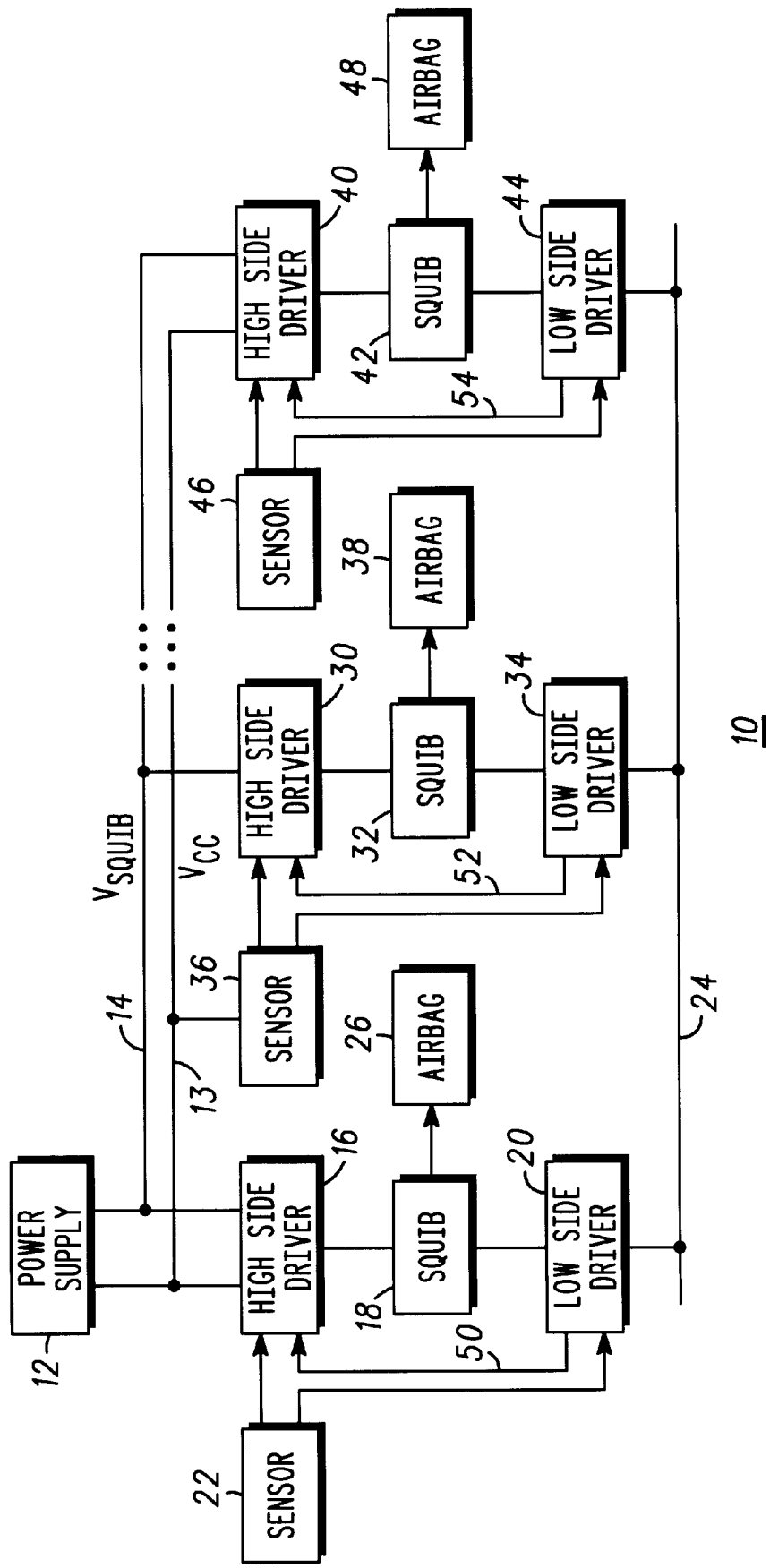
FIG. 1 illustrates a block diagram of an automotive airbag sense, control, and fire system.

Referring to FIG. 1, an automotive airbag sense, control, and fire system 10 is shown. A power supply 12 provides a positive potential $V_{CC}$, e.g. 46 volts, to power supply conductor 13 and a positive potential $V_{SQUIB}$, e.g. 40 volts, to power supply conductor 14. Power supply 12 is implemented as one or more banks of capacitors continuously charged by a boost regulator (not shown) from the vehicle electrical system. A first bank of capacitors coupled to power supply conductor 13 provides 300 microamps at 46 volts $V_{CC}$. A second bank of capacitors, larger than the first bank, is coupled to power supply conductor 14 and provides the 40 volts $V_{SQUIB}$ with 2 amps times the number of squibs to be fired. For the three squibs shown in FIG. 1, the second bank of capacitors must source 6 amps. It is important in terms of physical size constraints to minimize the current source requirements of the capacitor banks and the peak current requirements of the driver conduction path.

The airbag actuator in FIG. 1 is a half-bridge drive including a high-side driver and a low-side driver for each squib. High-side driver 16 receives power supply voltage $V_{CC}$ to operate the control circuitry and power supply voltage $V_{SQUIB}$ to fire squib 18. Squib 18 is coupled between high-side driver 16 and low-side driver 20. Low-side driver 20 is referenced to power supply conductor 24 operating at ground potential. Sensor 22 provides electrical signals to high-side driver 16 and low-side driver 20 to enable a 2 amp firing current to flow from power supply conductor 14 through squib 18 to power supply conductor 24. When squib 18 fires, it detonates an explosive charge which releases gases to inflate airbag 26.

High-side driver 30 receives power supply voltage $V_{CC}$ to operate the control circuitry and power supply voltage $V_{SQUIB}$ to fire squib 32. Squib 32 is coupled between high-side driver 30 and low-side driver 34, which is referenced to power supply conductor 24. Sensor 36 provides electrical signals to high-side driver 30 and low-side driver 34 to enable a firing current to flow from power supply conductor 14 through squib 32 to power supply conductor 24. When squib 32 fires, it detonates an explosive charge which releases gases to inflate airbag 38.

High-side driver 40 receives power supply voltage $V_{CC}$ to operate the control circuitry and power supply voltage $V_{SQUIB}$ to fire squib 42. Squib 42 is coupled between high-side driver 40 and low-side driver 44, which is referenced to power supply conductor 24. Sensor 46 provides electrical signals to high-side driver 40 and low-side driver 44 to enable a firing current to flow from power supply conductor 14 through squib 42 to power supply conductor 24. When squib 42 fires, it detonates an explosive charge which releases gases to inflate airbag 48.

Sensors 22, 36, and 46 are placed at strategic locations in the vehicle to detect a sudden deceleration or acceleration incident to a collision and provide electrical signals to the airbag actuator comprising the pairs of high-side drivers and low-side drivers. Upon receiving the sensor signal indicating the sudden deceleration or acceleration, the airbag actuator sends a firing signal to a squib, i.e. a 2 amp current. The firing signal to the squib which detonates an explosive charge and inflates the airbag. There is one squib per airbag.

For example, if sensor 22 detects a sudden deceleration, it sends a first sensor signal to high-side driver 16 and a second sensor signal to low-side driver 20. The high-side driver 16 and low-side driver 20 are enabled by the sensor signals to complete the conduction path between power supply conductor 14 and power supply conductor 24. High-side driver 16 and low-side driver 20 conduct a 2 amp current through squib 18, which is sufficient to fire the squib. Squib 18 detonates an explosive charge to release a gas that inflates airbag 26 to protect the occupants of the vehicle during the collision.

Similarly, if sensor 36 detects a sudden deceleration, it asserts one sensor signal to high-side driver 30 and another sensor signal to low-side driver 34. The high-side driver 30 and low-side driver 34 are enabled by the sensor signals to complete the conduction path between power supply conductor 14 and power supply conductor 24 and conduct a 2 amp current through squib 32. Squib 32 detonates an explosive charge to release a gas that inflates airbag 38. If sensor 46 detects a sudden deceleration, it asserts one sensor signal to high-side driver 40 and another sensor signal to low-side driver 44. The high-side driver 40 and low-side driver 44 are enabled by the sensor signals to complete the conduction path between power supply conductor 14 and power supply conductor 24 and conduct a 2 amp current through squib 42. Squib 42 detonates an explosive charge to release a gas that inflates airbag 48.

The sensors, airbag actuator, and squibs are electrically interconnected with a wiring harness. It is important to safeguard against electrical shorts or faults in the wiring harness. Such a short must not inadvertently fire the airbag. The airbag should fire only in the event of a sudden deceleration incident to a collision as sensed by sensors 22, 36, and 46. Firing the airbag at any other time is dangerous to the occupants and costly to repair and replace.

Each squib has a half-bridge drive implemented as a high-side driver on the positive side of the power supply and a low-side driver on the ground side of the power supply. The half-bridge drive avoids inadvertently firing the airbag in the event of a short or fault in the wiring harness. An electrical short can occur if the insulation around the wiring harness wears or breaks and allows the internal electrical conductors to come in contact with a positive power supply terminal or a ground terminal. For example, there is a positive power supply terminal which operates the horn in close proximity to the airbag system wiring harness in the steering column. The airbag system wiring harness also runs along the vehicle chassis which is ground potential. If the high side of the squib receives a positive power supply voltage from an electrical short or fault, then the low-side driver being disabled without a sensor signal does not complete the conduction path and thereby prevents the squib from firing. If the low side of the squib receives a ground potential from an electrical short, then the high-side driver being disabled without a sensor signal blocks the conduction path and thereby prevents the squib from firing.

The high-side driver and low-side driver current limit the conduction path through the squib so that a short or fault in the wiring harness on either side of the power supply will not draw excessive current from power supply 12 and prevent the firing of the other squibs when the sensor signals are asserted. For example, assume there is an electrical short to ground in the wiring harness on the high side of squib 18. When sensor 22 signals high-side driver 16 and low-side driver 20 to fire squib 18, high-side driver 16 becomes enabled and power supply 12 sources current into the electrical short to ground. Without current limit, the electrical short draws substantially all the current from power supply 12 and there is not sufficient current to fire squibs 32 and 42.

Low-side drivers 20, 34, and 44 are each set to current limit at 2 amps. As part of the present invention, high-side drivers 16, 30, and 40 are each initially set to current limit at 2 amps, which is the same as the current limit of low-side drivers 20, 34, and 44. However, to avoid the possibility of unstable operation or oscillation, which could have occurred in the prior art if both the high-side driver and low-side driver were set to current limit at the same value, the low-side driver provides a modulation signal to the high-side driver to dynamically increase the current limit threshold of the high-side driver as the low-side driver exceeds a predetermined value of current conduction.

The present invention provides the following advantages. The high-side driver and low-side driver can both be initially set to current limit at 2 amps, which is the current necessary to fire the squib. If the high-side driver current limits, then the current drawn from power supply 12 is limited to 2 amps. Consequently, the capacitor banks of power supply 12 are smaller as compared to the prior art (2.5 amp current limit) because they source less current. Furthermore, the main current carrying conduction transistors of the high-side driver are smaller since they carry less peak current, i.e. only 2 amps in the exemplary embodiment of the present invention instead of 2.5 amps as is common in the prior art.

If the low-side driver conducts current above a predetermined value, then the modulation signal from the low-side driver dynamically increases the current limit threshold of the high-side driver up to say 2.5 amps. The current limit threshold of the low-side driver remains at 2 amps. The current limit of the high-side driver stays above the current limit of the low-side driver to maintain stable operation and avoid the possibility of oscillations between the high-side driver and low-side driver control circuitry. In this situation, the low-side driver is handling the current limit at 2 amps. Even though the high-side driver current limit threshold increases, the high-side driver does not current limit so the power supply capacitor banks and high-side conduction path do not have to be sized to handle 2.5 amps. The high-side driver current limit increases to maintain a safe margin between the current limit thresholds of the low-side driver and high-side driver and thereby maintain stable operation of the airbag actuator.

The modulation signal from low-side driver 20 is applied to high-side driver 16 by conductor 50. The modulation signal from low-side driver 34 is applied to high-side driver 30 by conductor 52. The modulation signal from low-side driver 44 is applied to high-side driver 40 by conductor 54.

Figure 2:
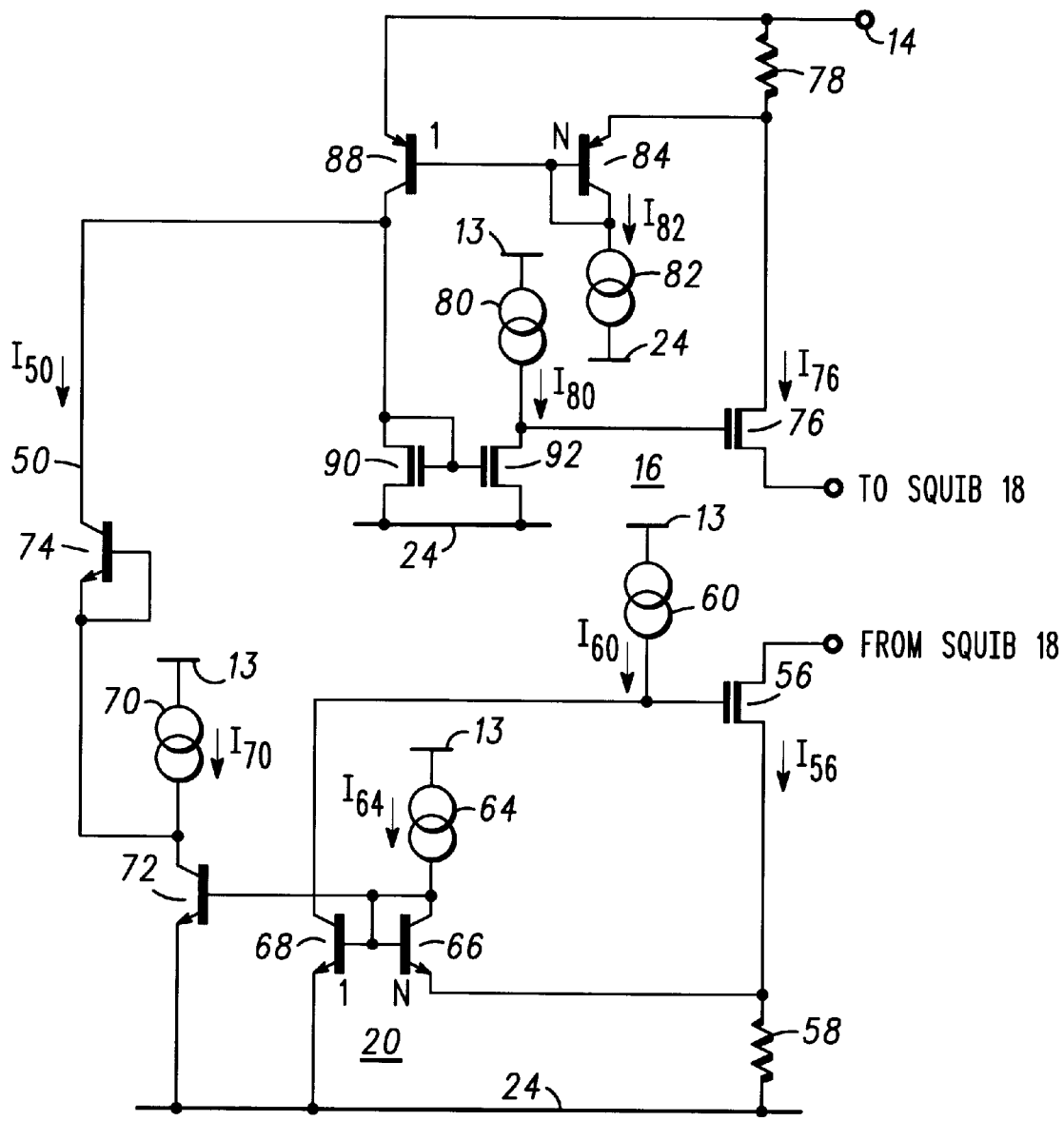
FIG. 2 is a schematic diagram of the high-side driver and low-side driver of FIG. 1.

Further detail of the high-side driver and low-side driver is shown in FIG. 2. As an example, low-side driver 20 includes transistor 56 in the current carrying conduction path of squib 18. Transistor 56 conducts current $I_{56}$ through resistor 58. Current source 60 operates in response to the sensor signal from sensor 22 to charge the gate of transistor 56. That is, when sensor 22 does not assert its sensor signal, current source 60 provides zero current. When sensor 22 asserts its sensor signal, current source 60 provides 100 microamps to charge the gate of transistor 56.

Current source 64 provides 10 microamps of current to bias the base of transistor 66. Initially, the current $I_{64}$ substantially flows through transistor 66 into resistor 58. As current $I_{56}$ increases, the voltage across resistor 58 increases and the base-emitter voltage ($V_{be}$) of transistor 66 decreases. As the current $I_{56}$ exceeds a predetermined value of 1 amp, the $V_{be}$ of transistor 66 falls below its threshold and transistor 66 turns off. The predetermined value of current $I_{56}$ which triggers the modulation current may be selected by device sizes and current source values. Transistor 66 is sized to have an emitter area N times the emitter area of transistor 68. The current $I_{64}$ now flows into the base of transistor 68 causing it to conduct more current. Transistor 68 conducts a portion of current $I_{60}$ to limit the charging current into the gate of transistor 56 so that current $I_{56}$ does not exceed 2 amps. Low-side driver 20 is thus current limited to 2 amps. The current limit for low-side driver 20 is given as:

$$I_{LIMIT\_LS}=V_T\ln(I_{60}/I_{64})/R_{58} \qquad (1)$$

where: $V_T$ is the transistor threshold voltage $R_{58}$ is the resistance of resistor 58

Current source 70 provides 20 microamps of current $I_{70}$ into the collector of transistor 72. The current $I_{64}$ initially biases transistor 72 to conduct current $I_{70}$. No current $I_{50}$ flows until the current through transistor 72 exceeds trip current $I_{70}$. As transistor 66 turns off when current $I_{56}$ exceeds 1 amp, more current $I_{64}$ flows into the base of transistor 72 causing it to conduct more than the trip current $I_{70}$. When the current through transistor 72 exceeds the trip current $I_{70}$, low-side driver 20 sends a modulation signal to high-side driver 16 to increase its current limit threshold. A current $I_{50}$ representing the modulation signal flows through conductor 50 and diode-configured transistor 74 into transistor 72. Transistor 74 operates as a blocking diode to block current source 70. The maximum value of modulation current $I_{50}$ occurs when the current through transistor 72 is equal to the current through transistor 68 which is equal to current $I_{60}$. The maximum current $I_{50}$ is equal to the charging current $I_{60}$ minus the trip current $I_{70}$.

High-side driver 16 in FIG. 2 includes transistor 76 in the current carrying conduction path of squib 18. Transistor 76 conducts current $I_{76}$ from power supply conductor 14 and resistor 78. Current source 80 operates in response to the sensor signal from sensor 22 to charge the gate of transistor 76. That is, when sensor 22 does not assert its sensor signal, current source 80 provides zero current. When sensor 22 asserts its sensor signal, current source 80 provides 100 microamps to charge the gate of transistor 76.

Current source 82 provides 10 microamps of current to bias the base of transistor 84. Initially, the current $I_{82}$ flows from resistor 78 through transistor 84. As current $I_{76}$ increases, the voltage across resistor 78 increases and the $V_{be}$ of transistor 84 decreases. As the current $I_{76}$ exceeds 1 amp, the $V_{be}$ of transistor 84 falls below its threshold and transistor 84 turns off. The current $I_{82}$ now flows into the base of transistor 88 causing it to conduct more current. Transistor 84 is sized to have an emitter area N times the emitter area of transistor 88. Transistor 88 conducts a current which is mirrored by a current mirror circuit comprising transistors 90 and 92. Transistor 92 conducts a current equal to that flowing through transistor 88. A portion of current $I_{80}$ flows into the output of current mirror 90-92 to limit the gate voltage of transistor 76 such that $I_{76}$ does not exceed 2 amps. High-side driver 16 is thus current limited to 2 amps.

Now consider the effect of the modulation current $I_{50}$ on high-side driver 16. If high-side driver 16 is current limiting, then all of the current flowing through transistor 88 is mirrored by current mirror circuit 90-92 to draw from current source 80 and limit the gate voltage of transistor 76. Absent modulation current $I_{50}$, high-side driver 16 current limits at 2 amps as described above. When low-side driver 20 is current limiting, a modulation current $I_{50}$ flows through conductor 50 and draws some of the current flowing through transistor 88. Consequently, there is less current flowing into current mirror transistor 90. Transistor 92 conducts less of the current $I_{80}$ and the gate voltage of transistor 76 is allowed to operate at a higher level. The current limit threshold of high-side driver 16 increases to say 2.5 amps. However, in this situation, high-side driver 16 is not actually in current limit mode. Low-side driver 20 is current limiting. The higher current limit for high-side driver 16 is primarily to maintain stable operation and prevent the possibility of oscillations between the control circuits of the high-side driver and low-side driver.

The modulation current $I_{50}$ is given by the following expression:

$$I_{50}=|I_{64}*\exp[(I_{64}*R_{58}+I_{56}*R_{58})/V_T]-I_{70}| \qquad (2)$$

The current limit threshold of high-side driver 16 during the time when low-side driver 20 is current limiting is given by the following expression:

$$I_{LIMIT\_HS}=V_T\ln[(I_{80}+I_{50})/I_{82})]/R_{58} \qquad (3)$$

The above example discloses modulating the high-side driver to increase its current limit once the low-side driver is operating in excess of a predetermined current value, e.g. 1 amp. A reciprocal embodiment is within the scope of the present invention, where the high-side driver current limits and modulates the low-side driver to increase its current limit threshold. An implementation of the high-side driver modulating the low-side driver is similar to the above discussion except in the latter case the high-side driver draws some current away from the current limiting action of the low-side driver to increase its current limit threshold.

Figure 3:
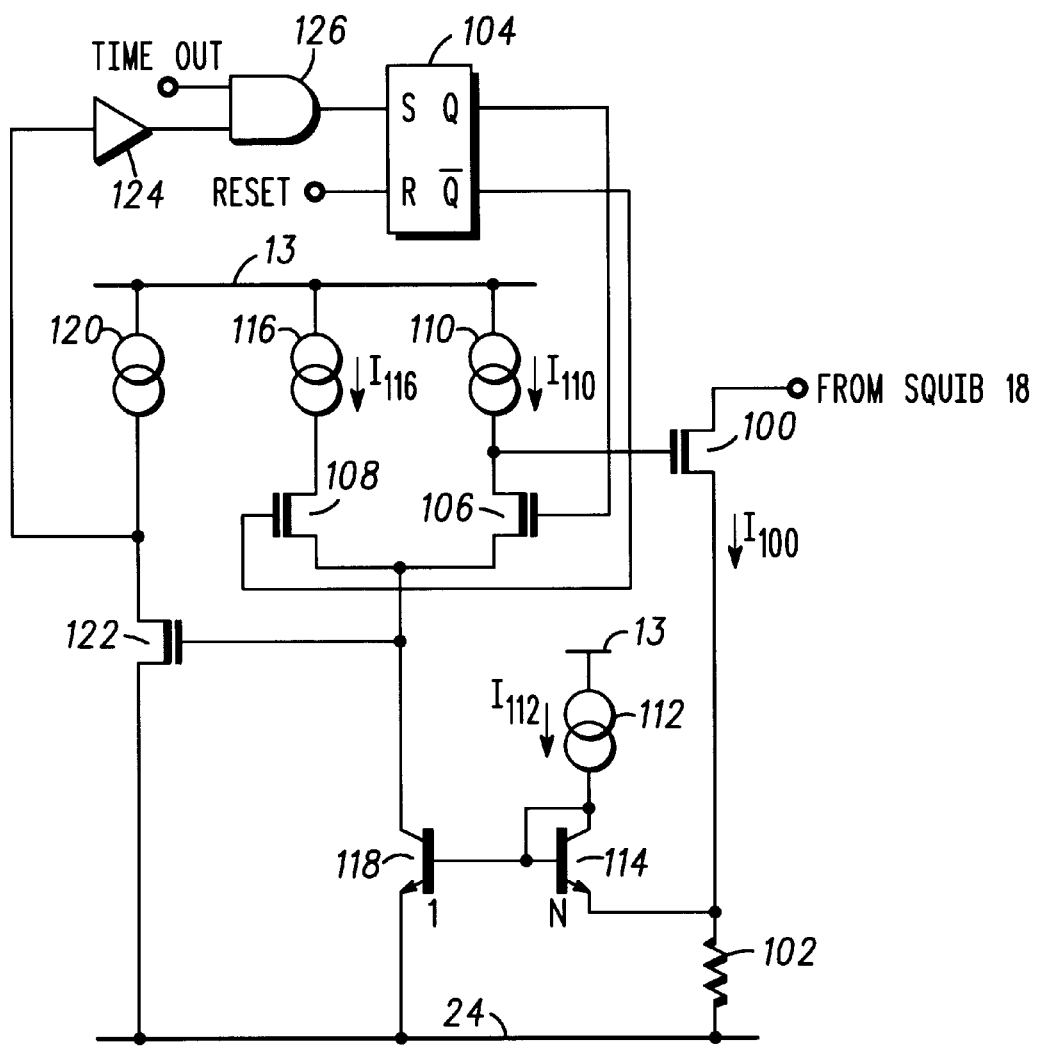
FIG. 3 is an alternate embodiment of the low-side driver of FIG. 1.

The embodiment of low-side driver 20 shown in FIG. 3 illustrates another feature of the present invention. Low-side driver 20 includes transistor 100 in the current carrying conduction path of squib 18. Transistor 100 conducts current $I_{100}$ through resistor 102. Flipflop 104 receives a logic zero RESET pulse at its reset input to set the Q-output to logic zero and the $\overline{Q}$-output to logic one. Transistor 106 is turned off and transistor 108 is turned on. Transistors 106 and 108 provide dual conduction paths for the charging current to transistor 100 and current limit detection feature provided by transistor 118. Current source 110 operates in response to the sensor signal from sensor 22 to charge the gate of transistor 100. That is, when sensor 22 does not assert its sensor signal, current source 110 provides zero current. When sensor 22 asserts its sensor signal, current source 110 provides 100 microamps to charge the gate of transistor 100.

Current source 112 provides 10 microamps of current to bias the base of transistor 114. Initially, the current $I_{114}$ flows through transistor 114 into resistor 102. Current source 116 provides 100 microamps of current $I_{116}$ through transistor 108 and transistor 118. Current source 120 provides 10 microamps of current to transistor 122. The voltage at the drain of transistor 122 is initially at a logic zero level. The output of buffer 124 is logic zero and the output of AND gate 126 is logic zero. Flipflop 104 remains in its reset state.

As current $I_{100}$ increases, the voltage across resistor 102 increases and the $V_{be}$ of transistor 114 decreases. As the current $I_{100}$ reaches the current limit of 2 amps, the $V_{be}$ of transistor 114 falls below its threshold and transistor 114 turns off. The current $I_{112}$ now flows into the base of transistor 118 causing it to conduct more current than current source 116 can provide. Transistor 114 is sized to have an emitter area N times the emitter area of transistor 118. As transistor 118 conducts more current, the gate voltage of transistor 122 decreases. Transistor 122 conducts less current. Current source 120 charges the voltage at the drain of transistor 122 to a logic one level. The output of buffer 124 is logic one.

A TIMEOUT signal is set to logic one after a predetermined period of time, say 100 microseconds, to ensure that transistor 100 conducts in full-on mode, i.e. no current limit, for at least that period of time. When TIMEOUT is logic one and the output of buffer 124 is logic one, then the output of AND gate 126 is logic one. The set input of flipflop 104 receives a logic one, which sets the Q-output to logic one and the $\overline{Q}$-output to logic zero. Transistor 106 turns on and transistor 108 turns off. Transistor 118 now conducts its current from current source 110 instead of current source 116. Current source 110 is no longer sourcing current solely into the gate terminal of transistor 100. Low-side driver 20 immediately enters into current limit as the charge to the gate of transistor 100 is regulated by transistor 118 drawing current from current source 110.

The embodiment of low-side driver 20 in FIG. 3 offers a number of advantages. The charging current to the gate of transistor 100 is continuous and full-on all the time up to current limit. Less time is required for low-side driver 20 to bring its conduction path up to 2 amps of current necessary to fire squib 18. Alternatively, the size of current sources 110 and 116 can be reduced to say 50 microamps to ease the size requirement of the capacitor banks.

The feature of generating a modulation current described in FIG. 2 is readily extendible to the current limiting features described in FIG. 3. A trip current source and transistor, similar to current source 70 and transistor 72 in FIG. 2, may be coupled to the output of current source 112. The modulation current is routed to a corresponding high-side driver to increase the current limit threshold in the high-side conduction path as described above.

In summary, the present invention provides a current limit on the low-side driver and a current limit on the high-side drivers. The current limits are initially set equal. If the low-side driver current limits, then a modulation current from the low-side driver increases the high-side driver current limit threshold to maintain stable operation of the control circuits. In addition, the present invention provides dual conduction paths to charge the main conduction transistor of the low-side driver, while detecting current limit. When current limit is detected, the charging current to the main conduction transistor is switched to current limit mode.

What is claimed is:

1. A half-bridge driver circuit, comprising:

a first driver having a conduction path coupled for receiving a first current, wherein the first driver has a current limit threshold to limit the first current in the conduction path of the first driver; and a second driver having a conduction path coupled for receiving the first current, wherein the second driver initially has a current limit threshold of the first driver to limit the first current in the conduction path of the second driver, and wherein the current limit threshold of the second driver is dynamically changeable.

2. The half-bridge driver circuit of claim 1, wherein the first driver includes an output for providing a modulation signal upon conducting a predetermined level of the first current through its conduction path and the second driver includes an input coupled for receiving the modulation signal which changes the current limit threshold of the second driver.

3. The half-bridge driver circuit of claim 1, wherein the first driver includes:

a first transistor (56) having first and second conduction terminals coupled in the conduction path of the first driver;

a first current source (60) having an output coupled to a control terminal of the first transistor;

a second current source (64) having an output;

a second transistor (66) having a first conduction terminal and a control terminal coupled to the output of the second current source, and a second conduction terminal coupled to the conduction path of the first driver; and a third transistor (68) having a first conduction terminal coupled to the output of the first current source, a second conduction terminal coupled to a power supply conductor (24), and a control terminal coupled to the output of the second current source.

4. The half-bridge driver circuit of claim 3, wherein the first driver further includes:

a third current source (70) having an output; and a fourth transistor (72) having a first conduction terminal coupled to the output of the third current source for providing the modulation signal, a second conduction terminal coupled to the power supply conductor, and a control terminal coupled to the output of the second current source.

5. The half-bridge driver circuit of claim 1, wherein the second driver includes:

a first transistor (76) having first and second conduction terminals coupled in the conduction path of the second driver;

a resistor (78) coupled in the conduction path of the second driver;

a first current source (80) having an output coupled to a control terminal of the first transistor;

a second current source (82) having an output;

a second transistor (84) having a first conduction terminal and a control terminal coupled to the output of the second current source, and a second conduction terminal coupled to a first terminal of the resistor;

a third transistor (88) having a control terminal coupled to the output of the second current source, a first conduction terminal coupled to a second terminal of the resistor, and a second conduction terminal coupled for receiving the modulation signal; and a current mirror (90-92) having an input coupled to the second conduction terminal of the third transistor and an output coupled to the output of the first current source.

6. An airbag control circuit, comprising:

a first driver (20) having a conduction path coupled between a first power supply conductor and a terminal coupled for receiving a firing current, wherein the first driver has an output for providing a modulation signal upon conducting a predetermined level of the firing current through its conduction path; and a second driver (16) having a conduction path coupled between a second power supply conductor and a terminal coupled for receiving the firing current, wherein the second driver has an input coupled for receiving the modulation signal which increases a current limit threshold of the second driver current.

7. The airbag control circuit of claim 6, wherein the first driver includes:

a first transistor (56) having first and second conduction terminals coupled in the conduction path of the first driver;

a first current source (60) having an output coupled to a control terminal of the first transistor;

a second current source (64) having an output;

a second transistor (66) having a first conduction terminal and a control terminal coupled to the output of the second current source, and a second conduction terminal coupled to the conduction path of the first driver; and a third transistor (68) having a first conduction terminal coupled to the output of the first current source, a second conduction terminal coupled to a power supply conductor(24), and a control terminal coupled to the output of the second current source.

8. The airbag control circuit of claim 7, wherein the first driver further includes:

a third current source (70) having an output; and a fourth transistor (72) having a first conduction terminal coupled to the output of the third current source for providing the modulation signal, a second conduction terminal coupled to the power supply conductor, and a control terminal coupled to the output of the second current source.

9. The airbag control circuit of claim 6, wherein the second driver includes:

a first transistor (76) having first and second conduction terminals coupled in the conduction path of the second driver;

a resistor (78) coupled in the conduction path of the second driver;

a first current source (80) having an output coupled to a control terminal of the first transistor;

a second current source (82) having an output;

a second transistor (84) having a first conduction terminal and a control terminal coupled to the output of the second current source, and a second conduction terminal coupled to a first terminal of the resistor;

a third transistor (88) having a control terminal coupled to the output of the second current source, a first conduction terminal coupled to a second terminal of the resistor, and a second conduction terminal coupled for receiving the modulation signal; and a current mirror (90-92) having an input coupled to the second conduction terminal of the third transistor and an output coupled to the output of the first current source.

10. A driver circuit having a conduction path, comprising:

a first transistor (100) having first and second conduction terminals coupled in the conduction path for conducting a first current;

a first current source (110, 116) having a first output for providing a charging current to a control terminal of the first transistor; and a switching circuit (106, 108) coupled between the first output of the first current source and a power supply conductor for conducting a portion of the charging current to limit the first current in the conduction path.

11. The driver circuit of claim 10, further including:

a second current source (112) having an output;

a second transistor (114) having a first conduction terminal and a control terminal coupled to the output of the second current source, and a second conduction terminal coupled to the conduction path; and a third transistor (118) having a first conduction terminal coupled to an output of the switching circuit, a second conduction terminal coupled to the power supply conductor, and a control terminal coupled to the output of the second current source.

12. The driver circuit of claim 11, wherein the switching circuit includes:

a fourth transistor (106) having a first conduction terminal coupled to the first output of the first current source, a second conduction terminal coupled to the first conduction terminal of the third transistor, and a control terminal coupled for receiving a first control signal; and a fifth transistor (108) having a first conduction terminal coupled to a second output of the first current source, a second conduction terminal coupled to the first conduction terminal of the third transistor, and a control terminal coupled for receiving a second control signal.

13. The driver circuit of claim 12, further including:

a third current source (120) having an output; and a fourth transistor (122) having a first conduction terminal coupled to the output of the third current source, a second conduction terminal coupled to the power supply conductor, and a control terminal coupled to the first conduction terminal of the third transistor.

14. The driver circuit of claim 13, further including:

a buffer (124) having an input coupled to the first conduction terminal of the fourth transistor; and a flipflop (104) having a set input coupled to an output of the buffer, a reset input coupled for receiving a reset signal, a first output for providing the first control signal, and a second output for providing the second control signal.

15. A method for changing a current limit threshold, comprising the steps of:

conducting a firing current through first and second conduction paths;

providing a modulation signal upon conducting a predetermined level of the firing current through the first conduction path; and changing a current limit threshold of the second conduction path in response to the modulation signal.

16. The method of claim 15, further including the steps of:

charging a control terminal of a first transistor in the first conduction path with a first current from a first current source; and drawing a portion of the first current away from the control terminal of the first transistor upon detecting the predetermined level of the firing current through the first conduction path.

17. The method of claim 16, further including the steps of:

sinking a second current from a second current source through a second transistor; and increasing conduction through the second transistor upon detecting the predetermined level of the firing current through the first conduction path, wherein the increasing conduction through the second transistor exceeds the second current and sinks a modulation current.

18. The method of claim 17, further including the steps of:

charging a control terminal of a third transistor in the second conduction path with a third current from a third current source; and drawing a portion of the third current away from the control terminal of the third transistor to current limit the second conduction path upon detecting a predetermined level of the firing current through the second conduction path.

19. The method of claim 18, further including the steps of reducing the portion of the third current drawn away from the control terminal of the third transistor by the modulation current to increase the current limit threshold of the second conduction path.

* * * * *